Sept. 1, 1925.    1,551,962
A. W. MARINER
ELEVATING AND DEPRESSING DEVICE FOR FURROW OPENERS AND MARKERS
Filed Sept. 1, 1922    2 Sheets-Sheet 2

Inventor
A. W. MARINER.
by
his Attorney

Patented Sept. 1, 1925.

1,551,962

UNITED STATES PATENT OFFICE.

ARCHIE W. MARINER, OF NEW CHURCH, VIRGINIA.

ELEVATING AND DEPRESSING DEVICE FOR FURROW OPENERS AND MARKERS.

Application filed September 1, 1922. Serial No. 585,735.

*To all whom it may concern:*

Be it known that ARCHIE W. MARINER, a citizen of the United States, residing at New Church, in the county of Accomac and State of Virginia, have invented certain new and useful Improvements in Elevating and Depressing Devices for Furrow Openers and Markers, of which the following is a specification.

This invention relates to furrow opener and marker attachments and it is an object of the invention to provide a device of this general character adapted to be secured to a fertilizer distributer of a box type and to travel in advance thereof, said opener or marker being constructed in a manner to substantially eliminate side pull.

Another object of the invention is to provide a device of this general character constructed in a manner permitting the same to be secured to the box of the fertilizer distributer at a point just above the axle to assure an even pull upon the assembled or combined apparatus eliminating strain of weight on necks of team.

Furthermore, it is an object of the invention to provide an attachment of this kind wherein a center lift is employed assuring a straight pull.

The invention also has for an object to provide an attachment of this kind which, when attached to a fertilizer distributer, preferably of a box type, provides an assembly whereby one team and a single driver can be employed to effect both a distribution of the fertilizer and the desired operation of a furrow opener or marker, or in other words providing in one operation what now generally requires two operations with the resultant saving of an extra team and driver.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 5 is a detail section through the spring supporting means for the outside or rear marker.

Figure 1:
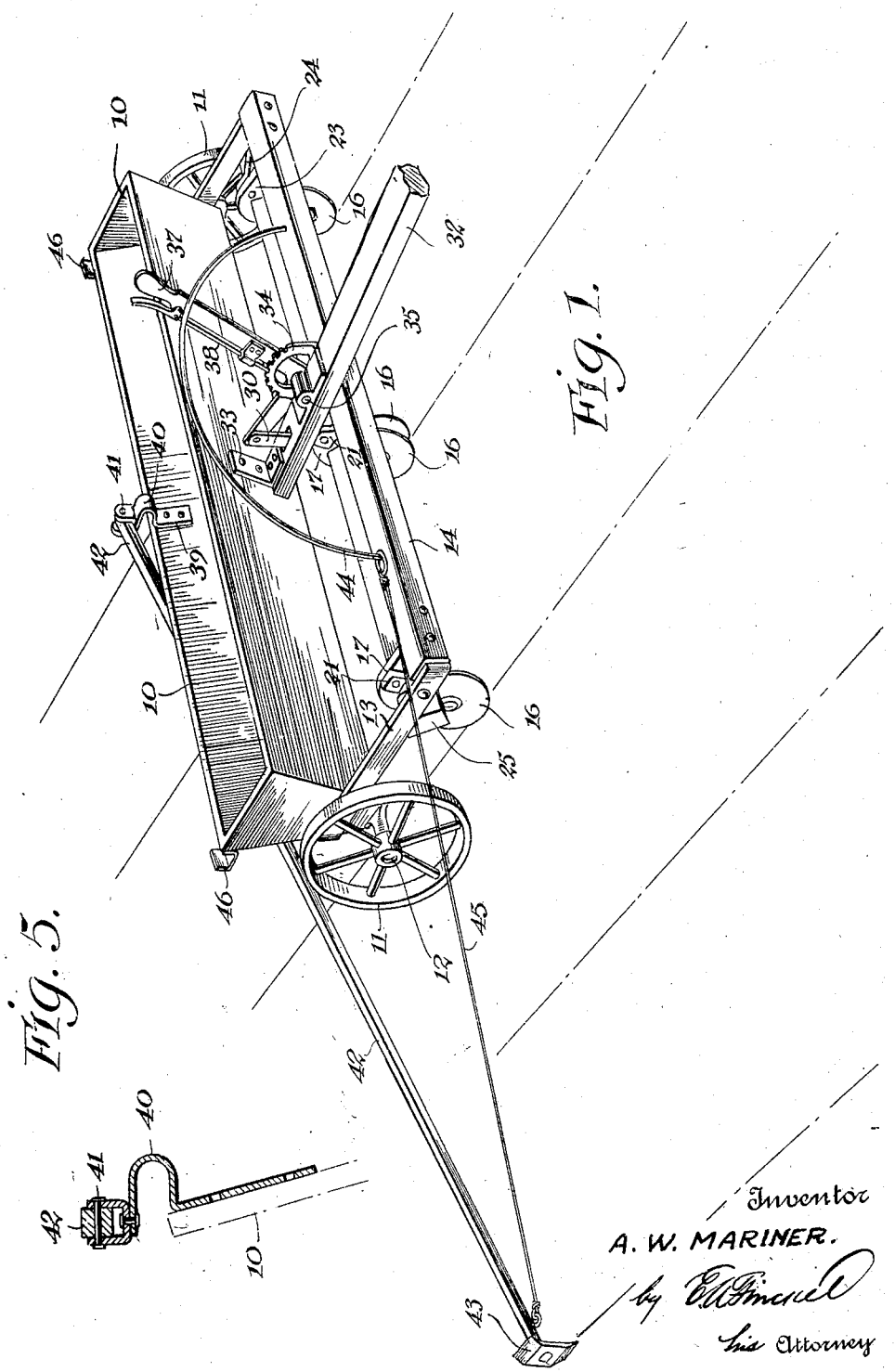
Figure 1 is a view in perspective illustrating a furrow opener and marker attachment constructed in accordance with an embodiment of my invention and in applied position, the draft tongue for the distributer being shown in fragment.
Figure 2:
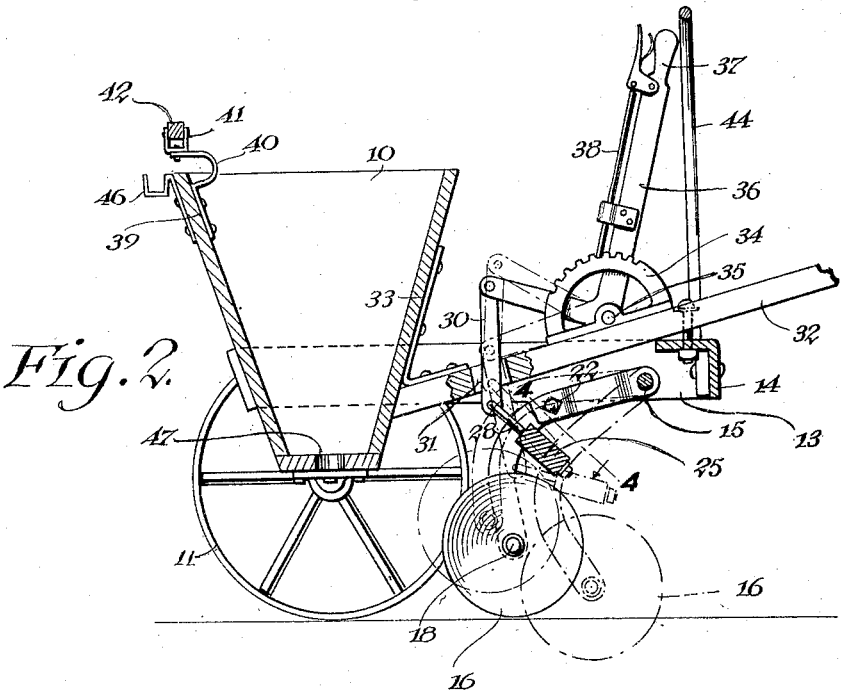
Figure 2 is a transverse sectional view taken substantially central through the structure illustrated in Figure 1.
Figures 3, 4:
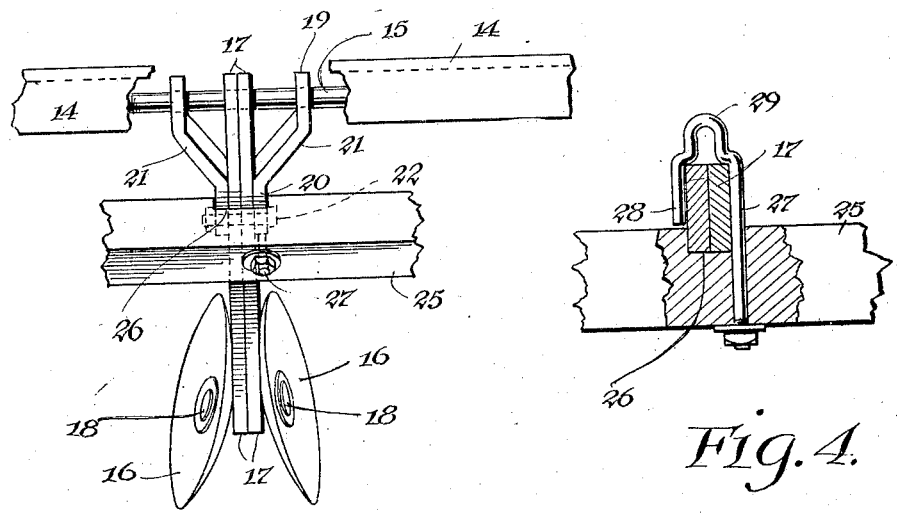
Figure 3 is a front view of the arrangement for supporting a central marker.
Figure 4 is a transverse section on the line 4—4 of Figure 2.

In the embodiment of the invention as herein illustrated there is shown a portable body having the usual trough or box 10 for fertilizer which is supported on wheels 11 carried on stub axles 12. Extending forwardly from each side of the trough or box 10 are arms 13 which are connected at their forward ends by an angle bar 14. The arms 13 and bar 14 constitute the frame of my improved attachment and when in applied position the arms 13 are secured to the ends of the trough or box 10 at a point closely adjacent to the axles 12. The arms 13 are also connected by means of a pivot rod, or shaft 15 and centrally of this shaft there is provided a special standard for carrying the disc wheel openers or markers 16. This standard consists of a pair of curved members 17 placed together and each carrying at its lower end a stub shaft 18 for the respective disc 16. The upper and forward ends of these members 17 are provided with suitable openings to receive the shaft 15. At each side of the double standard thus formed is a brace member which consists of an upper and forward portion 19 arranged at right angles to the shaft 15 and having openings through which said shaft passes, a lower and rear portion 20 fitting against a respective member 17 and a diagonal connecting portion 21 extending between portions 19 and 20. A single bolt 22 passes through the portions 20 and members 17 and thus holds the braces and standards securely together. It will be noted that the braces have offset ends, one of which bears against the respective standard while the other is in spaced relation thereto along the shaft 15. At each end of the shaft 15 there is provided a single standard 23 and brace 24, similar respectively to the standards 17 and braces just mentioned. Extending across these braces is a transverse beam 25 having a central notch 26 for the reception of the ends 20 and the central portions of the standard 17. At 27 is a bolt which passes through the beam 25 and is bent back upon itself as at 28 to embrace the standard. The portion of the bolt between its body and the bent back portion is formed to provide a U-shaped loop 29 to which the lower end of a link 30 passing through a slot 31 in the tongue 32 is connected. This tongue is secured to the front of the trough or body 10 adjacent the lower part thereof by a brace 33. Thus the tongue extends nearly in alignment with the stub axles 12 so that the pull is substantially direct. On this tongue is mounted a toothed segment 34 and centrally of this segment there is provided a shaft 35 carrying a bell crank lever 36, one arm of the bell crank being connected to the link 30 while the other arm is provided with a handle 37 and latch 38, the latter being of the usual character and working on the quadrant 34. It will be observed that the loop 29 and link 30 are disposed centrally of the beam 25 so that the lifting action is directly in the center when the lever 36 is operated and consequently there is no tilting stress.

To the upper rear portion of the trough 10 at the center thereof is mounted a bracket having a body portion 39 fixed to the rear wall of the trough and a goose neck 40 curved away from said wall and then backward to form a spring. On the extremity of this goose neck is swivelled a yoke 41 whereto is connected one end of a marker arm 42, the other end carrying a doubled edge marker 43. The marker arm 42 is connected to an arch bar 44 carried on the transverse member 14, by a rope 45. Supporting brackets 46 are carried at each rear corner of the body 10.

The bottom of the trough 10 is provided with the usual fertilizer distributing holes 47 and any suitable apparatus, not deemed necessary here to be shown, may be used to direct the fertilizer to and through these holes or to distribute the same, it being particularly noted that the holes 47 are arranged directly behind the respective marker discs 16.

In using this device the distributor is driven across the field, one center line being preferably laid out by any suitable means. In moving across the field the arm 42 is swung to the side which it is next proposed to cover by the marker and it will be noted that the link of the arm is such that the marker 43 makes a line on the ground corresponding to the center line of the next movement of the distributor. On arriving at the end of the rows the distributor is turned around and the driver observes that the center wheels 16 follow the line made by the marker 43 on his return. This is readily done because of the double disc wheels 16 and their central position. Of course, upon moving in the opposite direction the arms 42 is swung to the opposite side.

When it is desired to move the assembled apparatus from one place to the other without using the discs 16 or marker 43 the discs 16 are raised by proper manipulation of the lever 36 and the arm 42 is lifted and placed in one of the brackets 46.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

It will be understood that this invention is particularly designed to provide a furrow opening or marking attachment for fertilizer distributors, as distinguished from seed planters, the fertilizer distributor being adapted to precede a seed planter to prepare the ground in advance of the seed planter by marking the ground in rows and distributing the fertilizer along such marked rows, so that when the seed planter follows the marks or rows made by the fertilizer distributor, the seed dropped by the seed planter will get all the fertilizer laid in the rows by the fertilizer distributor, and by having the attachment fixed to the fertilizer distributor and constituting a rigid part thereof, there will be no shifting of the parts relatively one to the other, and consequently the fertilizer will always be distributed directly upon the lines or furrows made by the disks, and when followed by the seed planter, and the planter being guided by the marks of the disks and the fertilizer deposited directly upon the furrows made by the disks, the seed will all be deposited upon the lines of fertilizer and get all the benefit therefrom.

By using the rotary disk, as herein shown and described, the disks will readily cut their way through chaff, weeds, or sod without choking and leave plainly visible, clear furrows or marks.

So also by the arrangement herein, the draft tongue is so arranged and connected with the fertilizer distributor and its attached marking device, that the draft of the animals is substantially in a direct line with the supporting axle, whereby a more even and much lighter draft on the machine is provided.

Having thus described the invention what is claimed as new, is:—

1. In combination with a portable body, and a draft tongue secured substantially central thereof, a furrow opener and marker attachment comprising arms secured to the sides of the portable body at the lower portion thereof and extending forwardly of said body, a bar connecting the forward end portions of the arms, a rod interposed between and supported by the arms, ground working members attached to said rod, a beam engaged with the ground working members, and means carried by the tongue and operatively engaged with the beam for vertically adjusting the ground working members.

2. In combination with a portable body and a draft tongue secured substantially central thereof, a furrow opener and marker attachment comprising arms secured to the sides of the portable body at the lower portion thereof and extending forwardly of said body, a bar connecting the forward end portions of the arms, a rod interposed between and supported by the arms, ground working members attached to said rod, a beam engaged with the ground working members, a lever mounted upon the tongue for swinging movement, means for locking said lever against movement, the inner end portion of the tongue being provided with an opening, a link freely disposed through said opening in the tongue, means for connecting one end portion of the link to the beam, and means for connecting the opposite end portion of the link to the lever.

In testimony whereof I affix my signature.

ARCHIE W. MARINER.